(12) United States Patent
Klüpfel et al.

(10) Patent No.: US 10,857,501 B2
(45) Date of Patent: Dec. 8, 2020

(54) GAS SCRUBBER FOR DESULPHURISING FLUE GASES ON A SHIP

(71) Applicant: Babcock Noell GmbH, Wurzburg (DE)

(72) Inventors: Manfred Klüpfel, Werneck (DE); Andreas Breeger, Adendorf (DE)

(73) Assignee: Babcock Noell GmbH, Wurzburg (DE)

( * ) Notice: Subject to any disclaimer, the term of this patent is extended or adjusted under 35 U.S.C. 154(b) by 0 days.

(21) Appl. No.: 15/835,736

(22) Filed: Dec. 8, 2017

(65) Prior Publication Data
US 2018/0161720 A1 Jun. 14, 2018

(30) Foreign Application Priority Data

Dec. 9, 2016 (DE) .......... 10 2016 123 939

(51) Int. Cl.
| | |
|---|---|
| *F01N 3/08* | (2006.01) |
| *B01D 53/14* | (2006.01) |
| *F01N 3/04* | (2006.01) |
| *F23J 15/04* | (2006.01) |
| *F01N 13/08* | (2010.01) |
| *B01D 53/18* | (2006.01) |

(Continued)

(52) U.S. Cl.
CPC ......... *B01D 53/1481* (2013.01); *B01D 53/18* (2013.01); *C10G 45/02* (2013.01); *F01N 3/04* (2013.01); *F01N 13/004* (2013.01); *F01N 13/08* (2013.01); *F23J 15/04* (2013.01); *B01D 2252/103* (2013.01); *B01D 2256/24* (2013.01); *B01D 2257/302* (2013.01); *B01D 2257/304* (2013.01); *B01D 2257/306* (2013.01); *B01D 2258/012* (2013.01); *B01D 2259/4566* (2013.01); *F01N 2470/16* (2013.01); *F01N 2570/04* (2013.01); *F01N 2590/02* (2013.01); *F01N 2610/00* (2013.01); *F01N 2610/14* (2013.01); *F23J 2219/40* (2013.01); *Y02T 10/12* (2013.01)

(58) Field of Classification Search
CPC ........... F01N 3/08; F01N 3/0807; F01N 3/085
See application file for complete search history.

(56) References Cited

U.S. PATENT DOCUMENTS 5,558,818 A * 9/1996 Gohara ................ B01D 53/504
261/109
9,533,257 B2 1/2017 Gutperl et al.
(Continued)

FOREIGN PATENT DOCUMENTS

| CN | 204034548 U | 12/2014 |
|---|---|---|
| EP | 0689873 A2 | 1/1996 |

(Continued)

*Primary Examiner* — Randy Boyer
(74) *Attorney, Agent, or Firm* — The Webb Law Firm

(57) ABSTRACT

Described and depicted is a gas scrubber, in particular for desulphurising flue gases, preferably for installation on a ship, having a scrubber housing and a gas pipe arranged underneath the scrubber housing for guiding the gas to be scrubbed in the scrubber housing, wherein the scrubber housing has a scrubber chamber delimited by a scrubber base, a scrubber head and a scrubber shell provided between the scrubber base and the scrubber head. In order to achieve a more reliable operation, it is provided that a gas supply for the lateral introduction of gas via at least one opening into the scrubber chamber is provided in the region of the scrubber shell.

20 Claims, 5 Drawing Sheets

Figure 1:
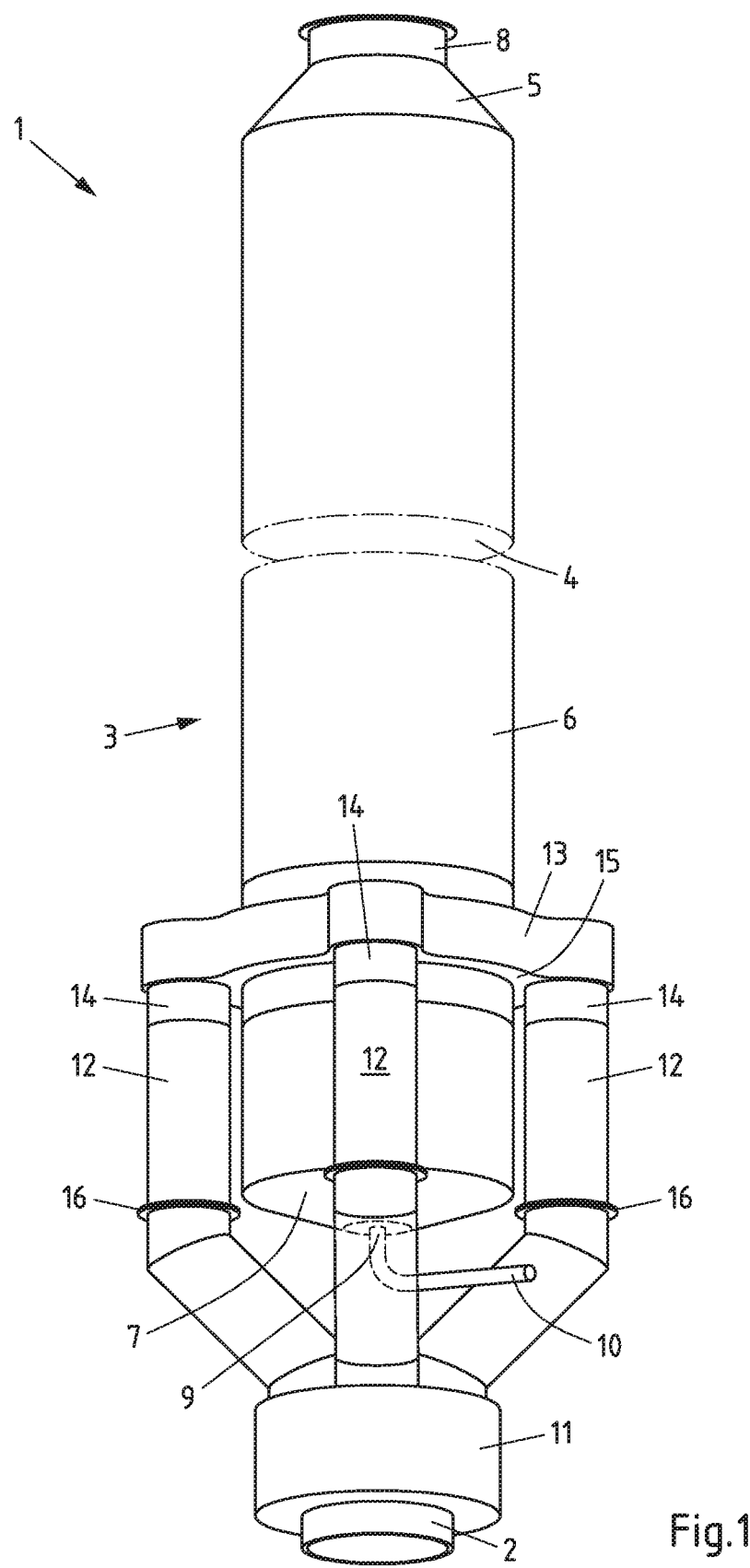

(51) Int. Cl.
*F01N 13/00* (2010.01)
*C10G 45/02* (2006.01)

(56) References Cited

U.S. PATENT DOCUMENTS

| | | |
|---|---|---|
| 2004/0011200 A1 | 1/2004 | Goode et al. |
| 2010/0206171 A1* | 8/2010 | Peng ................. B01D 53/1481 96/235 |
| 2018/0149054 A1* | 5/2018 | Gannefors ............ B01D 47/06 |

FOREIGN PATENT DOCUMENTS

| | | | |
|---|---|---|---|
| EP | 3085911 A1 | 10/2016 | |
| WO | 9944722 | 9/1999 | |
| WO | WO-9944722 A1 * | 9/1999 | ............ B01D 47/06 |
| WO | 2015113628 A1 | 8/2015 | |

* cited by examiner

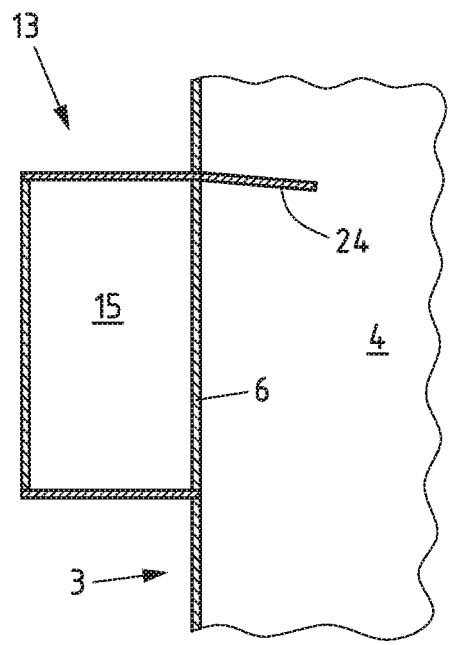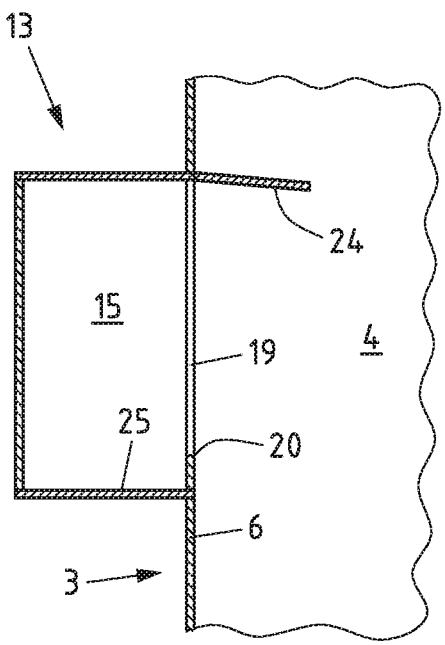
Fig.6　　　　Fig.7
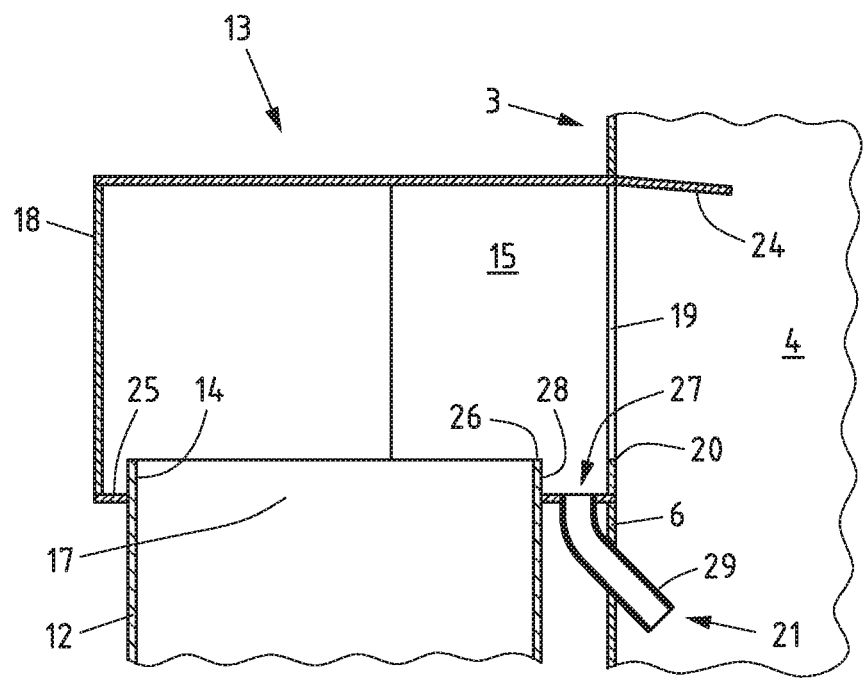
Fig.8

GAS SCRUBBER FOR DESULPHURISING FLUE GASES ON A SHIP

CROSS-REFERENCE TO RELATED APPLICATION

This application claims priority to German Patent Application No. 10 2016 123 939.9 filed Dec. 9, 2016, the disclosure of which is hereby incorporated in its entirety by reference.

The invention relates to a gas scrubber, in particular for desulphurising flue gases, preferably for installation on a ship, having a scrubber housing and a gas pipe arranged underneath the scrubber housing for guiding the gas to be scrubbed in the scrubber housing, wherein the scrubber housing has a scrubber chamber delimited by a scrubber base, a scrubber head and a scrubber shell provided between the scrubber base and the scrubber head. Additionally, the invention relates to a ship having such a gas scrubber.

Flue gases, which can have greater or lesser proportions of interfering materials depending on the fuel used and depending on the type of combustion, result from a, for example, engine combustion. These interfering materials often have to be removed from the flue gas for technical or legal reasons, which, for example, can occur with the aid of gas scrubbers. In the gas scrubbers, a scrubber chamber is provided in a scrubber housing, said scrubber chamber can be delimited outwards among other things by a scrubber base, a scrubber head and a scrubber shell arranged between the scrubber base and the scrubber head. A scrubbing liquid is sprayed in the scrubber chamber, said scrubbing liquid absorbing the interfering materials. If required, a reaction for converting the absorbed interfering materials takes place in the scrubbing liquid. In a particularly simple case, the scrubbing liquid can be water to which additives or reagents are added, if required.

In many cases, gas scrubbers are used in order to reduce the load of sulphur compounds, in particular sulphur oxides ($SO_x$), in the flue gas, therefore to separate the sulphur compounds. In this context, desulphurising or flue gas desulphurising is also referred to.

The flue gas desulphurising is obtaining increasing significance in more and more fields of application. One of these fields of application is flue gas desulphurising on ships. In the case of ship engines, which are mostly ship diesel engines which use sulphur-rich fuel, flue gases result with sulphur contents which should not and/or may not be emitted into the environment non-cleaned. Flue gas cleaning is therefore required. In the case of these and similar cases, a challenge exists in that only a very limited construction space is available for the gas cleaning. This often leads to the flue gas being guided into the gas scrubber via a gas pipe from below and in parallel to the scrubber axis. Thereby, installations are provided which are to prevent an entering of scrubbing liquid into the gas pipe, so that the scrubbing water cannot reach into the engine or act in an interfering manner in another way. These installations, however, do not always function satisfactorily. This is, in particular in the case of the application on ships or similar, the case since the systems and the gas scrubbers are not always optimally aligned or can oscillate.

The object of the invention is therefore to design and refine the gas scrubber and the ship of the type referred to at the beginning respectively, such that a reliable operation can be achieved.

This object is solved in the case of a gas scrubber according to the preamble of claim 1 in that a gas supply for the lateral introduction of gas into the scrubber chamber via at least one opening is provided in the region of the scrubber shell.

Additionally, the object referred to is solved according to claim 13 by a ship having a gas scrubber according to one of claims 1 to 12, preferably for cleaning, in particular for desulphurising, flue gases.

Through the supply of the gas to be cleaned into the scrubber chamber laterally via the scrubber shell even though the gas to be cleaned is supplied from below via the gas pipe, on the one hand a very space-saving construction is achieved, and simultaneously it is prevented that the scrubbing water reaches into the gas pipe. Therefore, both the risk is averted that the scrubbing liquid reaching into the gas pipe leads to problems, and the arrangement of the gas pipe known from stationary systems laterally to the gas scrubber and the connection of the gas pipe laterally to the gas scrubber is prevented, which would be spatially unfavourable.

Lastly, according to the invention, a combination of a gas supply from below and a gas introduction from the side is combined in an effective and space-saving manner, wherein simultaneously a passing over of scrubbing liquid into the gas pipe is prevented. This can be used advantageously in a particular manner on a ship, and indeed in particular for cleaning, preferably desulphurising flue gases there, since this cannot otherwise be solved satisfactorily.

In a first particularly preferred embodiment of the gas scrubber, the at least one opening for the lateral introduction of gas into the scrubber chamber is arranged at a distance from the scrubber base. In this manner it is ensured that scrubbing liquid can collect on the base in a so-called scrubber sump without scrubbing liquid thereby being able to reach into the gas pipe. Therein it is furthermore recommended that the distance corresponds at least to two times the height of the at least one opening. Therefore, a sufficient distance can be provided between the opening and the lower end of the scrubber housing or the lower end of the scrubber chamber$_{[di1]}$. A penetration of scrubbing liquid into the gas pipe can be prevented in an even safer manner if the at least one opening for the lateral introduction of gas into the scrubber chamber is arranged at a distance from the scrubber base which corresponds at least to three times, in particular at least to four times the height of the at least one opening. Alternatively or additionally, even more scrubbing water can then be held at the lower end of the scrubber housing or the lower end of the scrubber chamber.

In order to provide a flow of the gas to be cleaned that is as uniform as possible as well as space-saving, it is recommended that the gas supply is provided with several openings for the introduction of gas into the scrubber chamber. The openings can then be provided, for the sake of convenience, in the scrubber shell. For reasons of space, it is also preferred if at least two, in particular at least three, more particularly at least four, openings for the introduction of gas into the scrubber chamber are provided. With the increasing number of openings, an additional expense is indeed incurred for apparatus. Through the corresponding division of the gas flow, however, overall a very space-economical embodiment of the gas scrubber can be provided. This is, in particular, then the case if the several openings for the introduction of gas into the scrubber chamber are arranged to be distributed over the periphery of the scrubber shell. In terms of construction and fluid mechanics, it is therein advantageous if the openings are arranged to be distributed over the periphery of the scrubber shell at a regular distance from one another.

In order to supply the gas laterally to the scrubber chamber, it can also be expedient from the view of construction and fluid mechanics if an annular channel enclosing the shell region at least in sections is provided for the gas to be introduced into the scrubber. The annular channel must not completely encompass the scrubber shell, even if this will lead to preferred results in many cases. The annular channel is therefore already considered to be an annular channel if it forms a complete ring and does not enable a circumferential flow. The annular channel extends, however, in any case, over the predominant region of the periphery of the scrubber shell. Here, in particular, at least 80% or even at least 90% of the periphery is possible. At least one opening emits from the annular channel, via which the gas can reach from the annular channel into the scrubber chamber. Preferably, however, several openings, distributed in particular regularly over the periphery of the scrubber shell, for the introduction of the gas from the annular channel into the scrubber shell are provided. The openings can then, optionally, be considered to be provided in the annular channel and/or in the scrubber shell.

For reasons of space, at least one feed line for feeding the gas to the gas supply can be provided, at least in sections, laterally next to the scrubber shell. Therefore, the gas can expediently reach from the gas pipe underneath the scrubber housing upwards to the lateral gas supply for the introduction of the gas into the scrubber chamber. This is, to a particular extent, the case if the at least one feed line extends, at least in sections, in parallel to the longitudinal extension of the scrubber housing and/or the scrubber shell.

If a separate feed line for feeding the gas to the gas supply is allocated to each opening for the introduction of the gas into the scrubber chamber, feed lines with small cross-sections can be used. Lastly, the entire breadth of the gas scrubber can thereby be reduced. This increasingly leads to a spatial advantage, if at least two, preferably at least three, in particular at least four, feed lines are provided. Likewise, the feed lines can be arranged in a particularly space-saving manner if the feed lines are arranged to be distributed around the periphery of the scrubber shell, at a regular distance from one another. In the case that the scrubber shell is formed to be cylindrical, four feed lines are of particular advantage. These four feed lines can then be provided in the free corners of a square arranged around the scrubber shell. This space is often available anyway or is only able to be used with difficulty in another manner.

If, for the distribution of the gas flow to be cleaned, the at least two feed lines are connected to the gas pipe via a branch, an expedient transfer of the gas to be cleaned to the scrubber chamber is possible. Additionally, the branch can be used for optimisation in terms of fluid mechanics and therefore for limiting the pressure loss.

To save the slight construction space, the gas pipe and/or the at least one branch can be provided underneath the scrubber base. Therein underneath means preferably not or only partially, even laterally, projecting with respect to the scrubber base and/or the scrubber shell. Expressed in a different way, the gas pipe and/or the at least one branch can be arranged downwards at least partially in a projection of the scrubber base. In particular in the case of a cylindrical scrubber shell, it is particularly simple in terms of construction if the gas pipe and/or the at least one branch is provided at least substantially concentrically to the scrubber base, to the scrubber shell and/or to the scrubber chamber.

In order to prevent the scrubbing liquid being able to reach into the gas supply, it is recommended that a scrubbing liquid deflector projecting into the scrubber chamber is provided on the inner side of the scrubber shell above the at least one opening. The scrubbing liquid can then there be guided away from the scrubber shell. Since the scrubbing liquid deflector preferably extends into the scrubber chamber, the scrubbing liquid is also diverted into the scrubber chamber. This functions particularly well and reliably if the scrubbing liquid deflector and/or the upper side of the scrubbing liquid deflector is inclined downwards towards the centre of the scrubber chamber. Here, if required, an incline to the horizontal of between 2° to 15° is sufficient. Good results were achieved at an angle between 3° and 10°, preferably approximately 5°.

The deflection of the scrubbing liquid is particularly effective if an at least substantially circumferential ring projecting into the scrubber chamber is provided on the inner side of the scrubber shell above the at least one opening. The ring can be interrupted in sections. Preferably the ring circulates completely on the inner side of the scrubber shell. Thereby it is also preferred with regard to the corresponding ring and/or the upper side of the ring, that this is inclined downwards towards the centre of the scrubber chamber, preferably at an angle to the horizontal between 2° to 15°, in particular between 3° and 10°, more preferably approximately 5°.

If a gutter is provided between the at least one feed line and the scrubber shell, preferably in the gas supply, scrubbing liquid can collect therein which has escaped, despite any installation, from the scrubber chamber itself. So that the gutter does not overflow, this can be equipped with a drain for draining scrubbing liquid reaching from the scrubber chamber into the gutter. Thereby it is particularly expedient if the scrubbing liquid is guided from the gutter via the drain back into the scrubber chamber. The gutter and the scrubber chamber can then be connected to a line.

The upper edge of the at least one feed line can reach to at least the upper edge of the gutter and/or form the, if required upper, edge of the gutter at least in sections. Alternatively or additionally, it can be provided that the upper edge of the at least one feed line ends above the lower edge of the at least one allocated opening for the introduction of the gas into the scrubber chamber. All these embodiments ensure, individually or in combination, that it is more difficult for scrubbing liquid from the scrubber chamber to reach into a feed line, therefore into the gas pipe.

In a first particularly preferred embodiment of the ship, a combustion unit generating the flue gas can be provided. The combustion unit can be provided for driving the ship or for maintaining the desired operation of the ship. It is particularly preferred, however, if the combustion unit is an engine, since this runs very often and emits large quantities of flue gas, which, if required, should or must be cleaned, in particular desulphurised, despite the tight construction space. The engine can be the so-called main engine, which is regularly a ship diesel engine and serves for driving the ship. It can, however, alternatively or additionally, also be at least one so-called auxiliary diesel engine, so a smaller diesel engine, with which electricity and heat is obtained. To obtain heat, however, at least one boiler can also be used on the ship, which serves for the combustion of fuel. The boilers can, if required, be operated in parallel to the main engine and/or the at least one auxiliary diesel engine.

Alternatively or additionally, the gas scrubber can be provided as an in-line scrubber for cleaning the entire flue gas. This means that no bypass line for the gas to be cleaned to bypass the gas scrubber is provided. The gas scrubber must therefore be designed such that it can receive the maximum quantity of gas and, if required, also process it in the predetermined manner. This leads to a growing space requirement, which can be limited by the already described advantages insofar as the installation of an efficient gas scrubber is possible despite the small construction space available.

The invention is explained in greater detail below by means of a drawing merely depicting an exemplary embodiment. In the drawing is shown FIG. 1 a gas scrubber in a perspective view, FIG. 2 the gas scrubber from FIG. 1 in a top view from above, FIG. 3 the branch of the gas scrubber from FIG. 1 for distribution of the gas from a gas pipe across feed lines in a sectional view from above, FIG. 4 the gas supply of the gas scrubber from FIG. 1 in a schematic perspective view, FIG. 5 a first detail of the gas supply from FIG. 4 in a horizontal sectional view, FIG. 6 a second detail of the gas supply from FIG. 4 in a vertical sectional view according to the plane VI-VI from FIG. 5, FIG. 7 a third detail of the gas supply from FIG. 4 in a vertical sectional view according to the plane VII-VII from FIG. 5 and FIG. 8 a third detail of the gas supply from FIG. 4 in a vertical sectional view according to the plane VIII-VIII from FIG. 5.

In FIG. 1, a gas scrubber 1 for desulphurising flue gas on a ship is depicted. The flue gas thereby results, for example, from an engine or a boiler of the ship and is guided via a gas pipe 2 to the gas scrubbing from below. The gas pipe 2 is additionally arranged underneath the scrubber housing 3, and indeed at least substantially concentrically to the scrubber housing 3. The scrubber housing 3 is additionally aligned at least substantially vertically and encloses a scrubber chamber 4 in which a scrubbing liquid is injected and collected again. Additionally, the scrubber chamber 4 can have installations such as nozzle bases, bubble cap trays, packages or the like in order to ensure an intensive contact between the gas and the scrubbing liquid. Therefore, for example, a sufficient material exchange is provided.

The scrubber chamber 4 is delimited upwards by a scrubber head 5, laterally by a scrubber shell 6 and downwards by a scrubber base 7. A connecting piece 8 is provided on the scrubber head 5, through which connecting piece the cleaned gas is removed from the scrubber housing 3. A connecting piece 9 having a line 10 is provided on the scrubber base 7, via which line the scrubbing liquid can be removed, in order to then be injected again further above into the scrubber chamber 4. Corresponding connections are not depicted on the scrubber housing 3. Additionally, this can refer to a single-stage scrubber or a multi-stage scrubber.

The gas pipe 2 is connected to the scrubber chamber 4 not directly, but indirectly via a branch 11, feed lines 12 and a gas supply 13. The gas transported via the gas pipe 2 and to be cleaned reaches into a branch 11 in which the gas, in the case of the depicted and in this respect preferred gas scrubber, is distributed across four feed lines 12. The feed lines 12 extend from the branch 11, firstly at an angle outwards, and are then arranged partially laterally next to the scrubber shell 6. The upper ends 14 of the feed line 12 end in a gas supply 13 which, in the case of the depicted and in this respect preferred gas scrubber 1, provides an annular channel 15 which is completely circumferential around the scrubber shell 6. Therefore the gas flows from the feed lines 12 into the gas supply 13 and from there through the scrubber shell 6 into the scrubber chamber 4. Through the described connection of the scrubber chamber 4 to the gas pipe 2, it is reliably prevented that scrubbing liquid inadvertently reaches from the scrubber chamber 4 into the gas pipe 2. The scrubbing liquid could then easily reach into the engine or boiler of the ship arranged below the gas pipe and could there lead to problems and/or damage.

Figure 2:
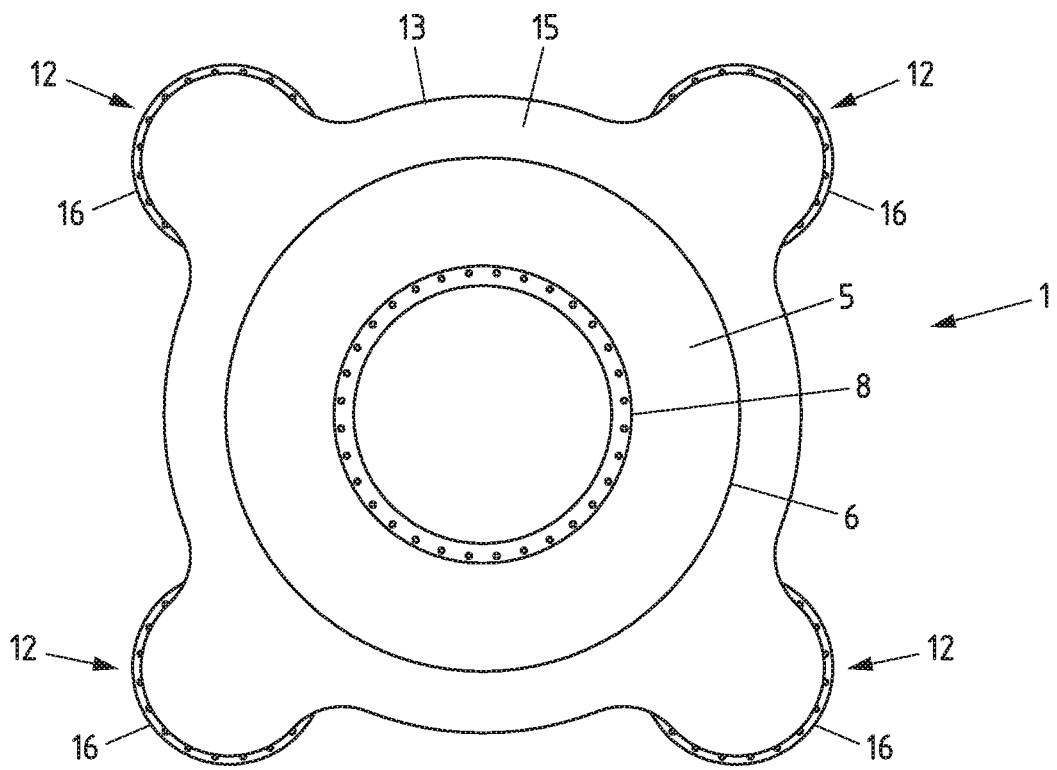

In FIG. 2, a top view onto the gas scrubber 1 from above is depicted. The scrubber housing 3 itself having the concentrically arranged connecting piece 8 for the cleaned gas on the scrubber head 5 is arranged in the centre. The gas supply 13 extends further downwards around the entire scrubber shell 6, wherein the feed lines 12 are connected to the gas supply 13, simultaneously distributed over the periphery of the scrubber shell 6. The feed lines 12 are connected to one another via an annular channel 15 in the gas supply 13. The gas scrubber 1 has, as a consequence of the four feed lines 12, an approximately square cross-section in the region of the gas supply 13.

Figure 3:
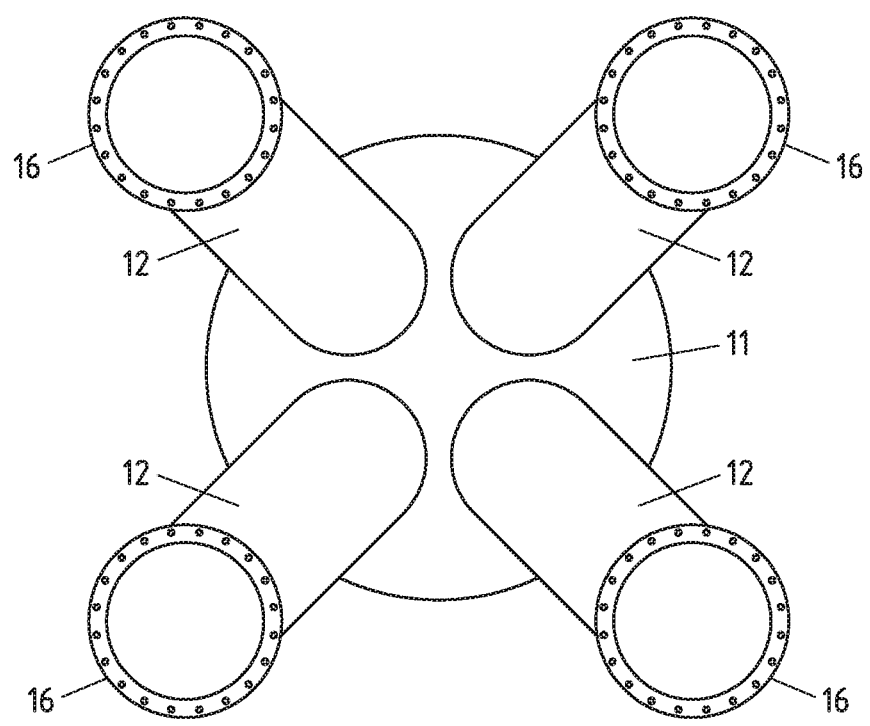

In FIG. 3, the branch 11 connected to the gas pipe 2 is depicted in a top view from above. The four feed lines 12 firstly extend at an angle upwards from the branch 11. In the depicted and in this respect preferred gas scrubber 1, the feed lines 12 are formed in two parts, wherein the angled and the vertical parts of the feed line 12 are connected to one another via flanges 16. The vertical parts of the feed lines 12 are arranged next to the scrubber shell 6 and slightly at a distance from the scrubber shell 6.

Figure 4:
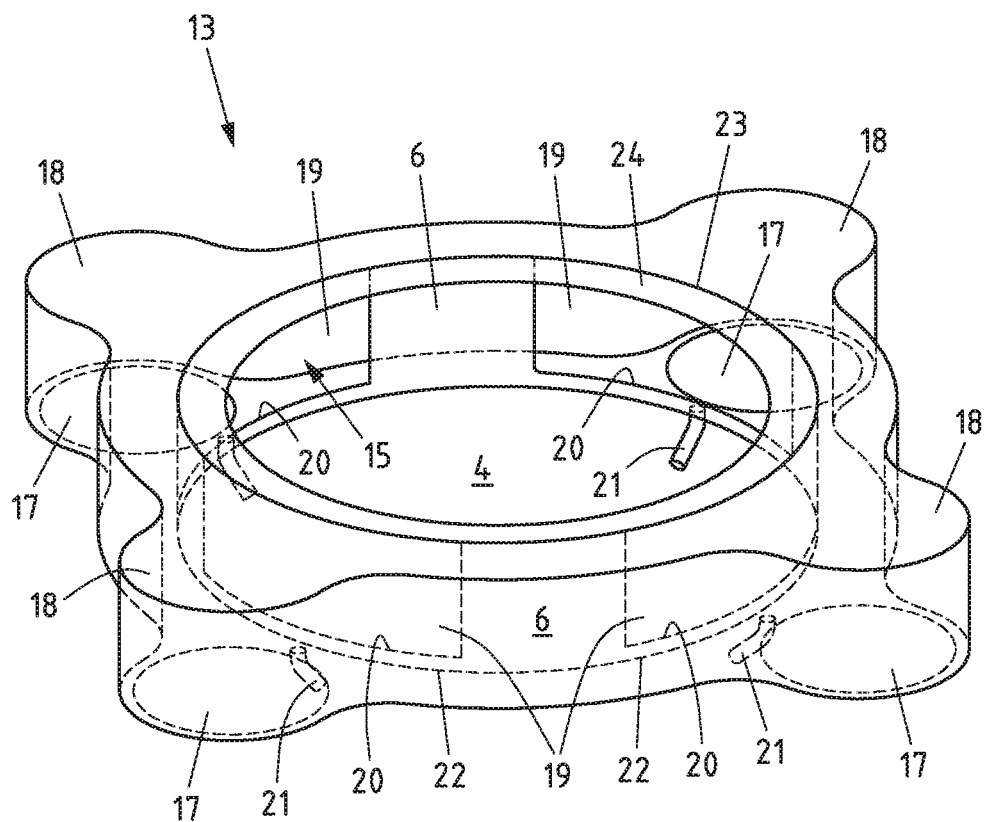

In FIG. 4, the gas supply 13 is depicted in more detail. Four supply openings 17 for receiving the upper ends 14 of the four feed lines 12 are provided, distributed over the periphery of the gas supply 13. Supply elements 18 are provided adjacent to these supply openings 17, said supply elements being connected to one another via an annular channel 15. The annular channel 15 is closed outwards between the supply elements 18. Four openings 19 are provided on the inner side of the annular channel 15, through which openings the gas can flow through the scrubber shell 6 into the scrubber chamber 4. The four openings 19 are distributed evenly over the periphery of the scrubber shell 6 and/or the gas supply 13 and are allocated to the supply elements 18 and/or feed lines 12 respectively. Additionally, the openings 19 have a lower edge 20, which is provided approximately above the lower edge of the gas supply 13. Additionally, four drains 21 are provided, allocated to the feed lines 12, and indeed between the feed lines 12 and the inner lower edge 22 of the gas supply 13. The inner upper edge 23 of the gas supply 13 has a circumferential, annular scrubbing liquid deflector 24 which extends from the scrubber shell 6 into the scrubber chamber 4. It is therefore achieved that the scrubbing liquid running downwards on the inner side of the scrubber shell 6 does not run into the annular channel 15 or the gas supply 13, but is diverted inwards. Nevertheless, scrubbing liquid entering the annular channel 15 can be guided via drains 21 back into the scrubber chamber 4 again, such that the scrubbing liquid does not collect in the gas supply 13 and therefore also cannot reach into the feed lines 12.

Figure 5:
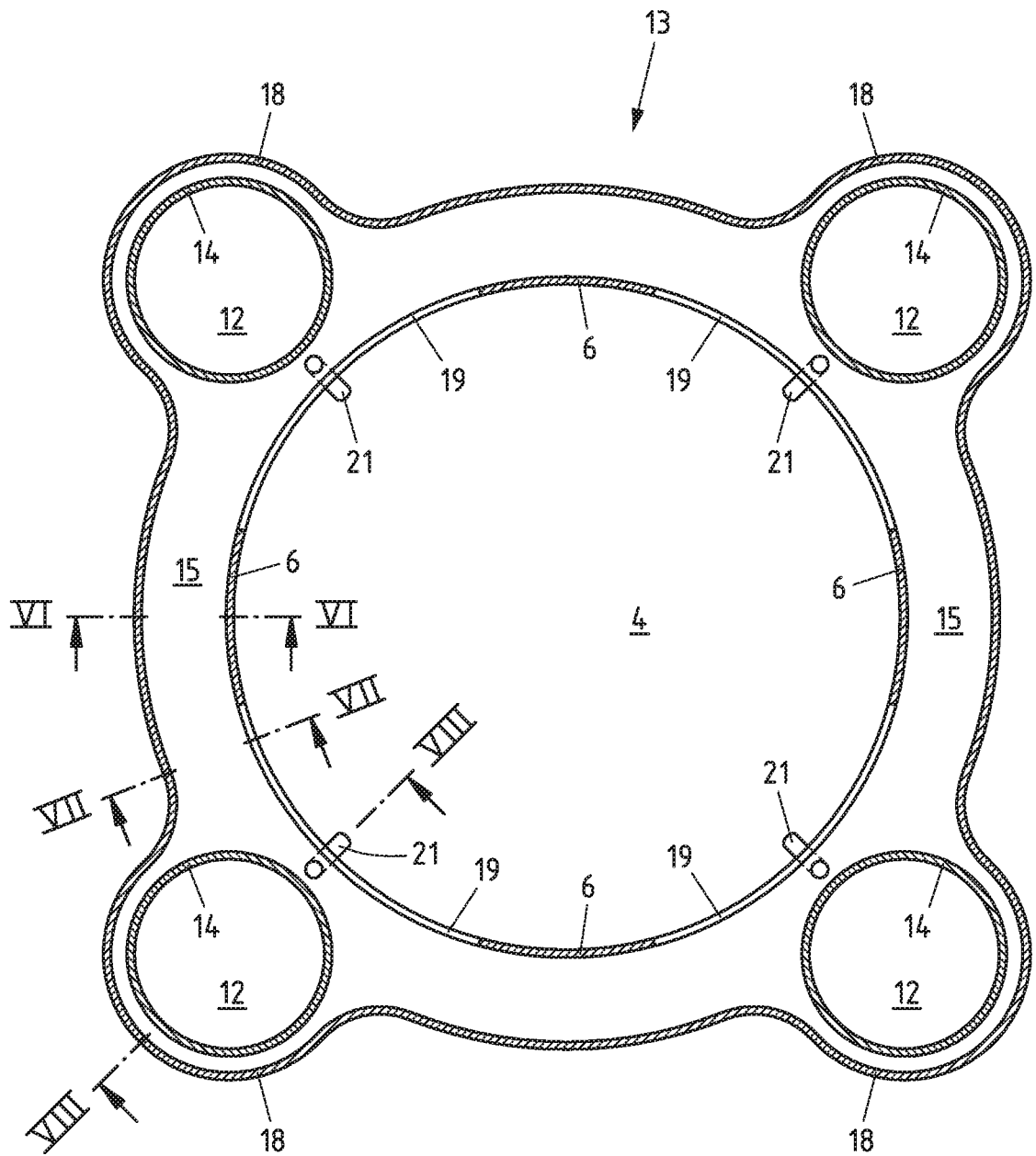

In FIG. 5, a horizontal cut through the gas supply 13 is depicted. Next to the scrubber shell 6, the openings 19 in the scrubber shell 6 for the introduction of the gas to be cleaned, the upper ends 14 of the feed lines 12 are also depicted in the supply elements 18. Additionally, the drains 21 for draining scrubbing liquid from a region of the gas supply 13 are provided between the feed lines 12 and the openings 19 back into the scrubber chamber 4 in the scrubber housing 3.

In FIG. 6, a vertical cross-section running in the radial direction through the gas supply 13 is depicted, and indeed in a region between two openings 19. The gas to be cleaned can flow in this region through the annular channel 15 to the next opening 19. Furthermore, on the inner side of the scrubber shell 6, a part of the circumferential, annular scrubbing liquid deflector 24 is depicted, which runs at a slight downward incline to its inner edge, and indeed, in the depicted and in this respect preferred gas scrubber 1, at approximately 5° to the horizontal.

In FIG. 7, a vertical cross-section running in the radial direction through the gas supply 13 is depicted, and indeed in the region of an opening 19 for the introduction of the gas to be cleaned into the scrubber chamber 4 of the scrubber housing 3. Also in this region, the scrubbing liquid deflector 24 provided to be circumferential inside the scrubber shell 6 is at a slight downward incline to its inner edge. Additionally, the lower edge 20 of the opening 19 is arranged at a slight distance upwards from the lower edge and from the base 25 of the gas supply 13 and/or the annular channel 15.

In FIG. 8, a vertical cross-section running in the radial direction through the gas supply 13 in the region of the upper end 14 of the feed line 12 and the supply element 18 is depicted. The upper edge 26 of the feed line 12 ends, like the opening 19 for the introduction of the gas to be cleaned into the scrubber chamber 4, slightly above the lower edge of the gas supply 13 or the base 25 of the gas supply 13 and/or the annular channel 15. Therefore, a gutter 27 is formed between the opening 19 and the associated feed line 12, the outer edge 28 of which gutter 27, in the depicted and in this respect preferred gas scrubber 1, is formed by the lower edge 20 of the opening 19 and the upper edge 26 of the feed line 12. A drain 21 is provided on the base 25 of the gutter 27, said drain comprising a drain line 29 which guides, if possible, scrubbing liquid reaching into the gutter 27 through the scrubber shell 6 back into the scrubber chamber 4 of the scrubber housing 3.

LIST OF REFERENCE NUMERALS

1 Gas scrubber
2 Gas pipe
3 Scrubber housing
4 Scrubber chamber
5 Scrubber head
6 Scrubber shell
7 Scrubber base
8 Connecting piece
9 Connecting piece
10 Line
11 Branch
12 Feed lines
13 Gas supply
14 End
15 Annular channel
16 Flange
17 Supply openings
18 Supply elements
19 Opening
20 Lower edge
21 Drain
22 Inner lower edge
23 Inner upper edge
24 Scrubbing liquid deflector
25 Base
26 Upper edge
27 Gutter
28 Outer edge
29 Drain line

The invention claimed is:

1. A gas scrubber comprising:
a scrubber housing and a gas pipe arranged underneath the scrubber housing for guiding the gas to be scrubbed in the scrubber housing, wherein the scrubber housing has a scrubber chamber delimited by a scrubber base, a scrubber head and a scrubber shell provided between the scrubber base and the scrubber head,
wherein
a gas supply for the lateral introduction of gas from the gas pipe into the scrubber chamber via at least one opening is provided in the exterior of the scrubber shell, and
wherein the gas pipe is positioned lower than the scrubber base.

2. The gas scrubber according to claim 1,
wherein
the at least one opening for the lateral introduction of gas into the scrubber chamber is arranged at a distance from the scrubber base and, wherein the distance corresponds at least to two times the height of the at least one opening.

3. The gas scrubber according to claim 1,
wherein
the gas supply is provided with at least two openings for the introduction of gas into the scrubber chamber, and wherein the at least two openings for the introduction of gas into the scrubber chamber are distributed over the periphery of the scrubber shell.

4. The gas scrubber according to claim 1,
wherein
an annular channel enclosing the shell region at least in sections is provided for the gas to be introduced into the scrubber chamber, and the annular channel has at least one opening for the introduction of the gas from the annular channel into the scrubber chamber.

5. The gas scrubber according to claim 1,
wherein
at least one feed line for feeding the gas to the gas supply is provided, at least in sections, laterally next to the scrubber shell, and wherein the at least one feed line extends, at least in sections, in parallel to the longitudinal extension of the scrubber housing or the scrubber shell.

6. The gas scrubber according to claim 1,
wherein
a separate feed line for feeding the gas to the gas supply is allocated to each opening for the introduction of the gas into the scrubber chamber, and wherein at least two feed lines are arranged to be distributed around the periphery of the scrubber shell.

7. The gas scrubber according to claim 5,
wherein
the at least one feed line includes at least two feed lines connected to the gas pipe via at least one branch for the division of a gas flow from the gas pipe.

8. The gas scrubber according to claim 7,
wherein
the gas pipe or the at least one branch is provided underneath the scrubber base.

9. The gas scrubber according to claim 1,
wherein
a scrubbing liquid deflector projecting into the scrubber chamber is provided on the inner side of the scrubber shell above the at least one opening, and wherein the scrubbing liquid deflector or an upper side of the scrubbing liquid deflector is inclined downwards towards the centre of the scrubber chamber.

10. The gas scrubber according to claim 1, wherein
an at least substantially circumferential scrubbing liquid deflector in the form of a ring, projecting into the scrubber chamber, is provided on the inner side of the scrubber shell above the at least one opening, and wherein the ring or an upper side of the ring is inclined downwards towards the centre of the scrubber chamber.

11. The gas scrubber according to claim 5, wherein
a gutter is provided between the at least one feed line and the scrubber shell in the gas supply, and wherein a drain for draining scrubbing liquid reaching from the scrubber chamber into the gutter is connected to the gutter.

12. The gas scrubber according to claim 11, wherein
an upper edge of the at least one feed line reaches to at least an upper edge of the gutter, forms an edge or the upper edge of the gutter at least in sections, and the upper edge of the at least one feed line ends above a lower edge of the at least one allocated opening for the introduction of the gas into the scrubber chamber.

13. A ship having the gas scrubber according to claim 1 for cleaning flue gases.

14. The ship according to claim 13, wherein
the ship has a combustion unit generating the flue gas.

15. The ship according to claim 13, wherein
the gas scrubber is provided as an in-line scrubber for cleaning the entire flue gas.

16. The gas scrubber according to claim 2, wherein the distance corresponds to at least three times the height of the at least one opening.

17. The gas scrubber according to claim 4, wherein the at least one opening comprises several openings distributed regularly over the periphery of the scrubber shell.

18. The gas scrubber according to claim 6, wherein the at least two feed lines are arranged at a regular distance from one another.

19. The gas scrubber according to claim 8, wherein the gas pipe or the at least one branch is provided downwards at least partially in a projection of the scrubber base and concentrically to the scrubber base, to the scrubber shell, or to the scrubber chamber.

20. The gas scrubber according to claim 9, wherein the scrubbing liquid deflector or the upper side of the scrubbing liquid deflector is inclined downwards towards the centre of the scrubber chamber, at an angle to the horizontal between 2° to 15°.

* * * * *